United States Patent
Grace et al.

(10) Patent No.: US 12,322,821 B2
(45) Date of Patent: Jun. 3, 2025

(54) BATTERY STRUCTURE WITH ENERGY ABSORPTION MEMBERS

(71) Applicant: Ford Global Technologies, LLC, Dearborn, MI (US)

(72) Inventors: Ihab Grace, Grosse Pointe Woods, MI (US); Avinash Venkata Yella, Farmington Hills, MI (US); Michael William Danyo, Trenton, MI (US); Munis Emin Yildiz, Istanbul (TR); Onur Dalli, Istanbul (TR); Burak Erdemi, Istanbul (TR); Ilhan Kurklu, Istanbul (TR); Merve Emeksiz, Istanbul (TR); Samet Sertkaya, Surrey (GB)

(73) Assignee: Ford Global Technologies, LLC, Dearborn, MI (US)

( * ) Notice: Subject to any disclaimer, the term of this patent is extended or adjusted under 35 U.S.C. 154(b) by 1334 days.

(21) Appl. No.: 16/677,828

(22) Filed: Nov. 8, 2019

(65) Prior Publication Data
US 2021/0143380 A1    May 13, 2021

(51) Int. Cl.
| | |
|---|---|
| *H01M 50/242* | (2021.01) |
| *B60L 50/64* | (2019.01) |
| *H01M 50/233* | (2021.01) |
| *H01M 50/24* | (2021.01) |

(52) U.S. Cl.
CPC ......... *H01M 50/242* (2021.01); *B60L 50/64* (2019.02); *H01M 50/233* (2021.01); *H01M 50/24* (2021.01); *H01M 2220/20* (2013.01)

(58) Field of Classification Search
CPC .... H01M 50/20; H01M 50/233; H01M 50/24; H01M 50/242; H01M 50/249; H01M 50/262; H01M 2220/20; B60L 50/64; Y02E 60/10; Y02T 10/70
See application file for complete search history.

(56) References Cited

U.S. PATENT DOCUMENTS

| | | | |
|---|---|---|---|
| 8,881,853 B2 | 11/2014 | Nitawaki | |
| 9,623,742 B2 | 4/2017 | Ikeda et al. | |
| 10,112,563 B2 | 10/2018 | Ashraf et al. | |
| 2013/0088044 A1* | 4/2013 | Charbonneau | B62D 27/023 296/187.12 |
| 2015/0176673 A1* | 6/2015 | Kaneko | B60R 19/18 188/377 |
| 2016/0311301 A1* | 10/2016 | Ikeda | B62D 29/001 |

FOREIGN PATENT DOCUMENTS

DE    102010050826 A1    5/2012

* cited by examiner

*Primary Examiner* — Kiran Quraishi Akhtar
(74) *Attorney, Agent, or Firm* — David B. Kelley; Carlson, Gaskey & Olds, P.C.

(57) ABSTRACT

An apparatus and method, according to an exemplary aspect of the present disclosure includes, among other things, a battery support structure to support a plurality of battery cells, wherein the battery support structure includes opposing longitudinal sides and opposing lateral sides. A first extrusion is positioned to extend along at least one of the opposing longitudinal and lateral sides. A second extrusion is connected to the first extrusion such that the first extrusion is located between the plurality of battery cells and the second extrusion.

23 Claims, 5 Drawing Sheets

BATTERY STRUCTURE WITH ENERGY ABSORPTION MEMBERS

TECHNICAL FIELD

This disclosure relates generally to a battery support structure comprising a plurality of energy absorption members for a vehicle that is powered by a high voltage battery.

BACKGROUND

A high voltage battery pack for powering electric vehicles and other electrical loads typically includes multiple battery assemblies, or battery arrays, that include a plurality of interconnected battery modules comprised of battery cells. The battery cells are located within an enclosure or support structure for protection from high impact load events.

SUMMARY

An apparatus according to an exemplary aspect of the present disclosure includes, among other things, a battery support structure to support a plurality of battery cells, wherein the battery support structure includes opposing longitudinal sides and opposing lateral sides. A first extrusion is positioned to extend along at least one of the opposing longitudinal and lateral sides. A second extrusion is connected to the first extrusion such that the first extrusion is located between the plurality of battery cells and the second extrusion.

In a further non-limiting embodiment of the foregoing apparatus, the first extrusion comprises first and second primary side rails extending along the opposing longitudinal sides of the battery support structure.

In a further non-limiting embodiment of any of the foregoing apparatus, the first and second primary side rails extend along an entirety of the opposing longitudinal sides of the battery support structure.

In a further non-limiting embodiment of any of the foregoing apparatus, the second extrusion comprises a plurality of discrete energy absorption structures that are spaced apart from each other along the first and second primary side rails.

In a further non-limiting embodiment of any of the foregoing apparatus, the second extrusion comprises first and second secondary side rails that extend along at least portions of the first and second primary side rails.

In a further non-limiting embodiment of any of the foregoing apparatus, the second extrusion comprises a plurality of outer walls that enclose a plurality of hollow chambers.

In a further non-limiting embodiment of any of the foregoing apparatus, the plurality of hollow chambers are separated from each other by a plurality of internal walls that are surrounded by the plurality of outer walls to form a closed section.

In a further non-limiting embodiment of any of the foregoing apparatus, at least one of the plurality of outer walls is a straight wall.

In a further non-limiting embodiment of any of the foregoing apparatus, at least one of the plurality of outer walls is a curved wall.

In a further non-limiting embodiment of any of the foregoing apparatus, the curved wall abuts directly against an outboard surface of the first extrusion.

In a further non-limiting embodiment of any of the foregoing apparatus, opposing ends of the curved wall include flanges that are fixed to corresponding flanges on opposing ends of the outboard surface of the first extrusion.

In a further non-limiting embodiment of any of the foregoing apparatus, the first extrusion comprises a closed section with a plurality of hollow chambers.

In a further non-limiting embodiment of any of the foregoing apparatus, the first extrusion extends along at least one of the opposing lateral sides and wherein the second extrusion is fixed to an outboard side of the first extrusion.

An apparatus, according to yet another exemplary aspect of the present disclosure includes, among other things, a battery support structure to support a plurality of battery cells, wherein the battery support structure includes first and second longitudinal sides and first and second lateral sides. A plurality of cross members extend between the first and second longitudinal sides, a first extrusion is positioned to extend along each of the first and second longitudinal sides to provide first and second primary side rails, and a second extrusion is connected to the first extrusion such that the first extrusion is located inboard of the second extrusion.

In a further non-limiting embodiment of any of the foregoing apparatus, the first extrusion comprises a closed section with a first plurality of hollow chambers, and wherein the second extrusion comprises a closed section with a second plurality of hollow chambers that are positioned outboard of the first plurality of closed chambers.

In a further non-limiting embodiment of any of the foregoing apparatus, the second extrusion includes at least one curved outer wall portion and at least one straight wall portion.

In a further non-limiting embodiment of any of the foregoing apparatus, the curved wall portion abuts directly against an outboard surface of the first extrusion.

In a further non-limiting embodiment of any of the foregoing apparatus, the first extrusion includes at least one internal wall that extends laterally across the closed section to form the first plurality of hollow chambers, and wherein the curved wall portion includes an apex that is aligned with the at least one internal wall to define a first load path from the second extrusion to the first extrusion.

In a further non-limiting embodiment of any of the foregoing apparatus, opposing ends of the curved wall portion include flanges that are fixed to corresponding flanges on opposing ends of the outboard surface of the first extrusion to define second and third load paths from the second extrusion to the first extrusion.

A method according to still another exemplary aspect of the present disclosure includes, among other things, providing a battery support structure to support a plurality of battery cells, wherein the battery support structure includes opposing longitudinal sides and opposing lateral sides; forming a first extrusion to extend along at least one of the opposing longitudinal and lateral sides; and connecting a second extrusion to the first extrusion such that the first extrusion is located directly inboard of the second extrusion.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary battery support structure that includes energy absorption members comprising first and second extrusions.

Figure 1:
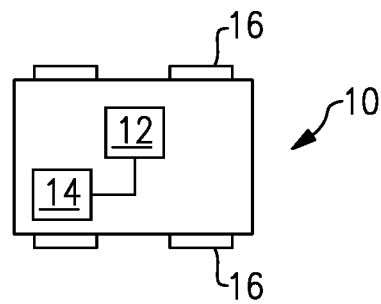
FIG. 1 is a schematic illustration of one example of an electrified vehicle.

FIG. 1 schematically illustrates an example electrified vehicle 10 that includes a battery 12, an electric machine 14, and wheels 16. The electric machine 14 can receive electric power from the battery 12. The electric machine 14 converts the electric power to torque that drives the wheels 16. The battery 12 is a high voltage traction battery in some embodiments.

The example electrified vehicle 10 is an all-electric vehicle, i.e. a battery electric vehicle (BEV). In other examples, the electrified vehicle 10 is a hybrid electric vehicle or plug-in hybrid electric vehicle (PHEV), which can selectively drive the wheels 16 with torque provided by an internal combustion engine instead of, or in addition to, the electric machine.

The battery 12 is an exemplary electrified vehicle battery. The battery 12 may be a high voltage traction battery pack that includes a plurality of battery assemblies (i.e., battery arrays or groupings of battery cells) 18 capable of outputting electrical power to operate the electric machine 14. The battery cells 18 are positioned underneath a vehicle floor 20 and include a support structure 24 for protection purposes as shown in FIG. 2.

The battery support structure 24 supports the plurality of battery cells 18 and has first 26 and second 28 longitudinal sides and first 30 and second 32 lateral sides. The first 26 and second 28 longitudinal sides extend in a direction that is along a length of the vehicle 10 and the first 30 and second lateral sides extend in a direction that is along a width of the vehicle 10. In one example, the first 26 and second 28 longitudinal sides have a greater length than the first 30 and second 32 lateral sides. The battery support structure 24 includes a plurality of cross members 34 (FIG. 4) extending in a lateral direction between the first 26 and second 28 longitudinal sides. A first extrusion 40 is positioned to extend along each of the first 26 and second 28 longitudinal sides. In one example, the first extrusions 40 provide first and second primary side rails for the battery support structure 24. A second extrusion 42 is connected to the first extrusion 40 such that the first extrusion 40 is located inboard of the second extrusion 42. In one example, the second extrusions 42 provide first and second secondary side rails or side rail portions for the battery support structure 24.

Figure 2:
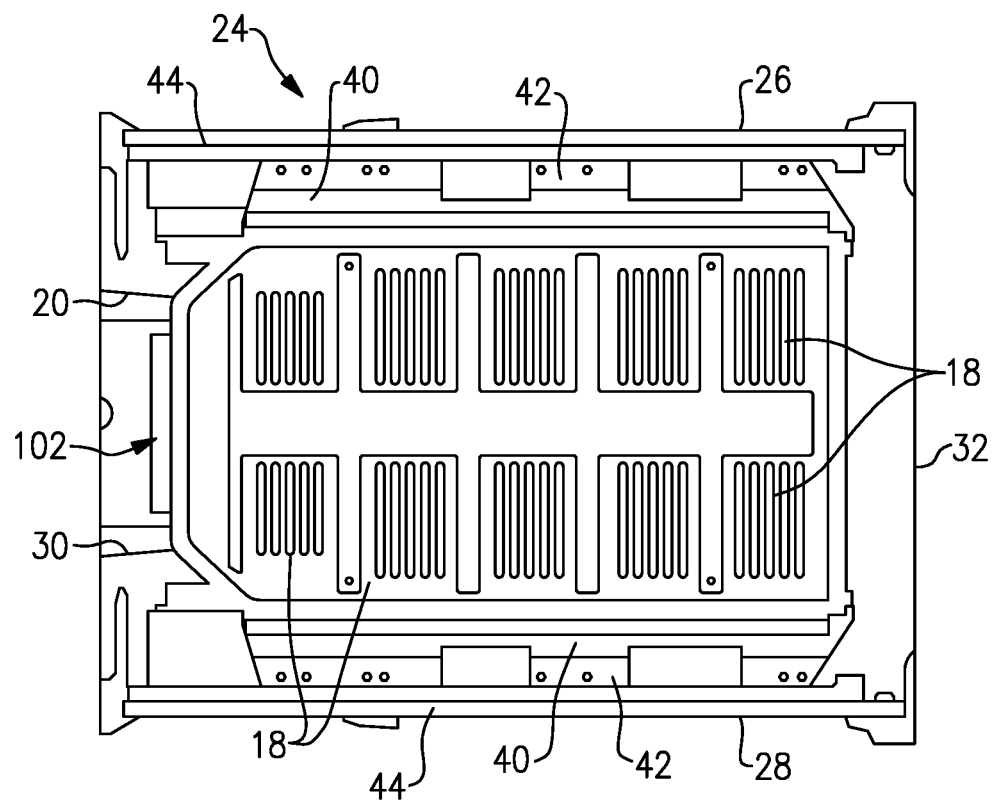
FIG. 2 is a bottom view of a battery support structure with a plurality of battery cells.
Figure 3:
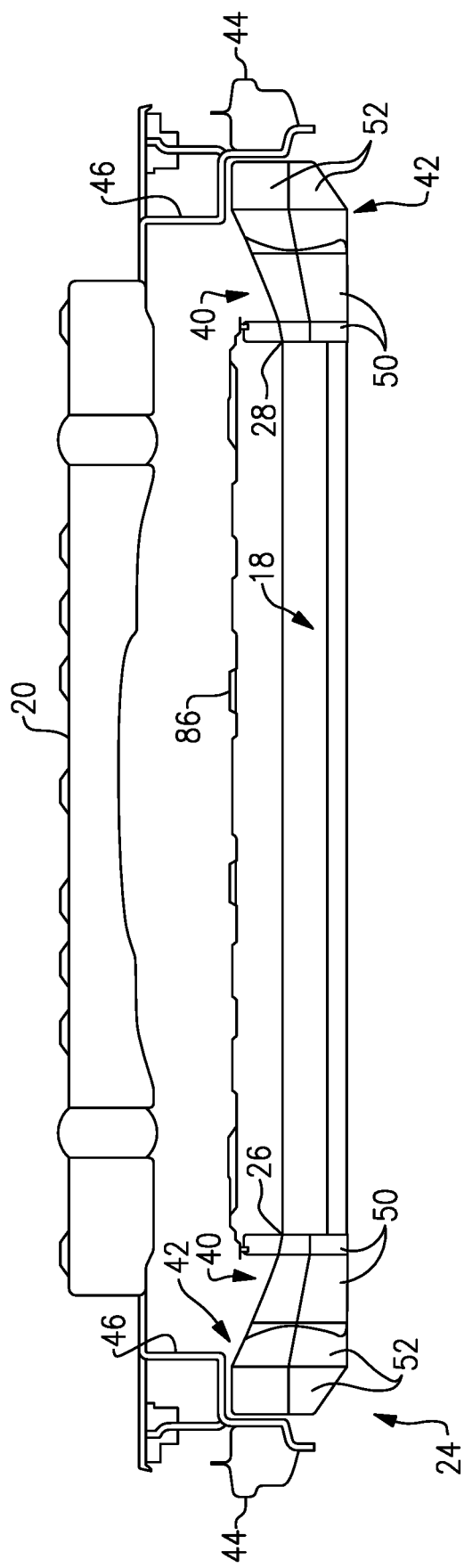
FIG. 3 is a section end view of the battery support structure of FIG. 2 as connected to a vehicle floor.

Side rockers 44 are positioned outboard of the second extrusions 42 as shown in FIGS. 2-3. The side rockers 44 extend in the longitudinal direction along the vehicle 10 and connect to longitudinal frame members 46. The frame members 46 support the vehicle floor 20 as shown in FIG. 3.

Figure 4:
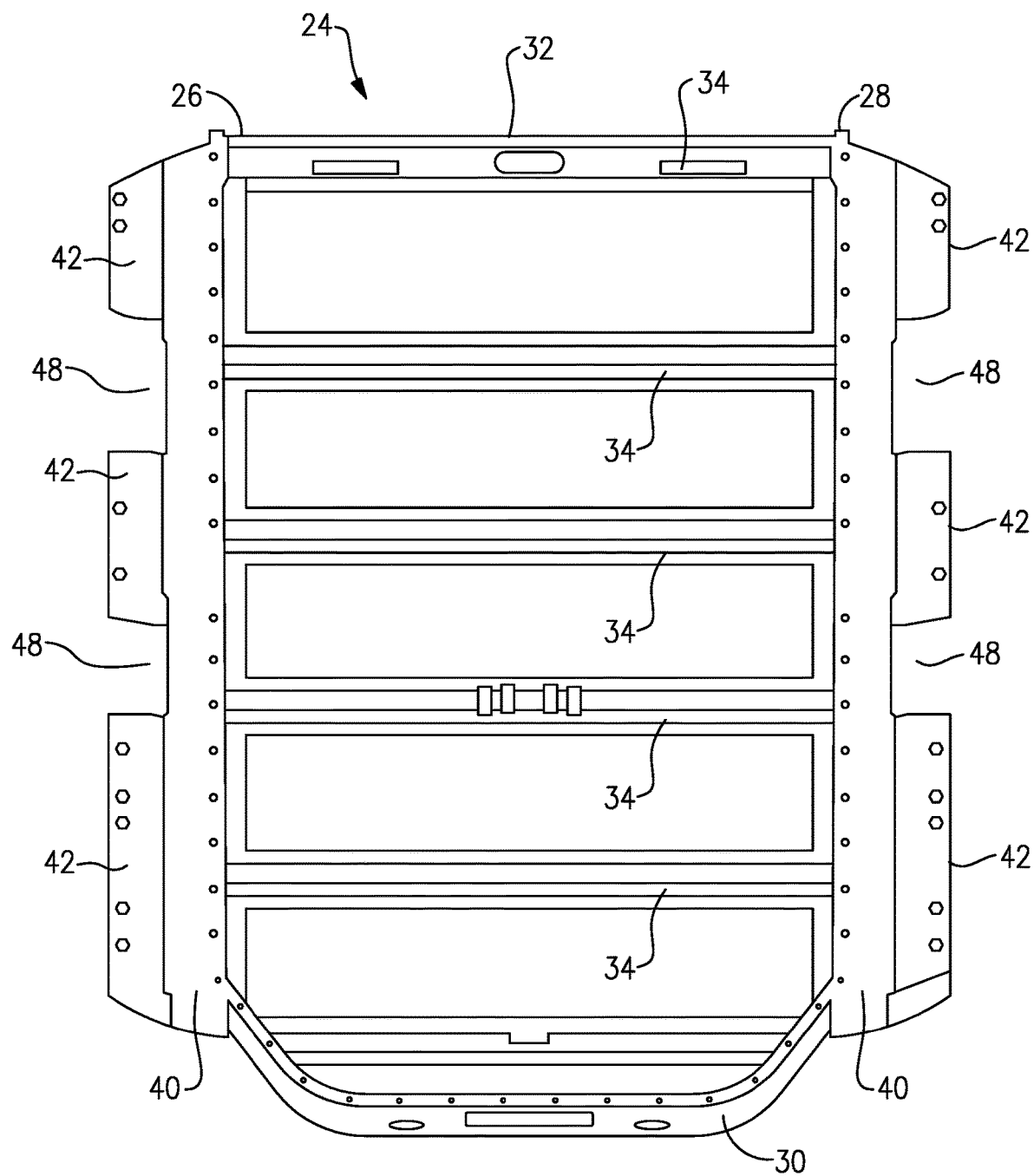
FIG. 4 is a top view of the battery support structure including a plurality of cross members and first and second side extrusions.
Figure 5:
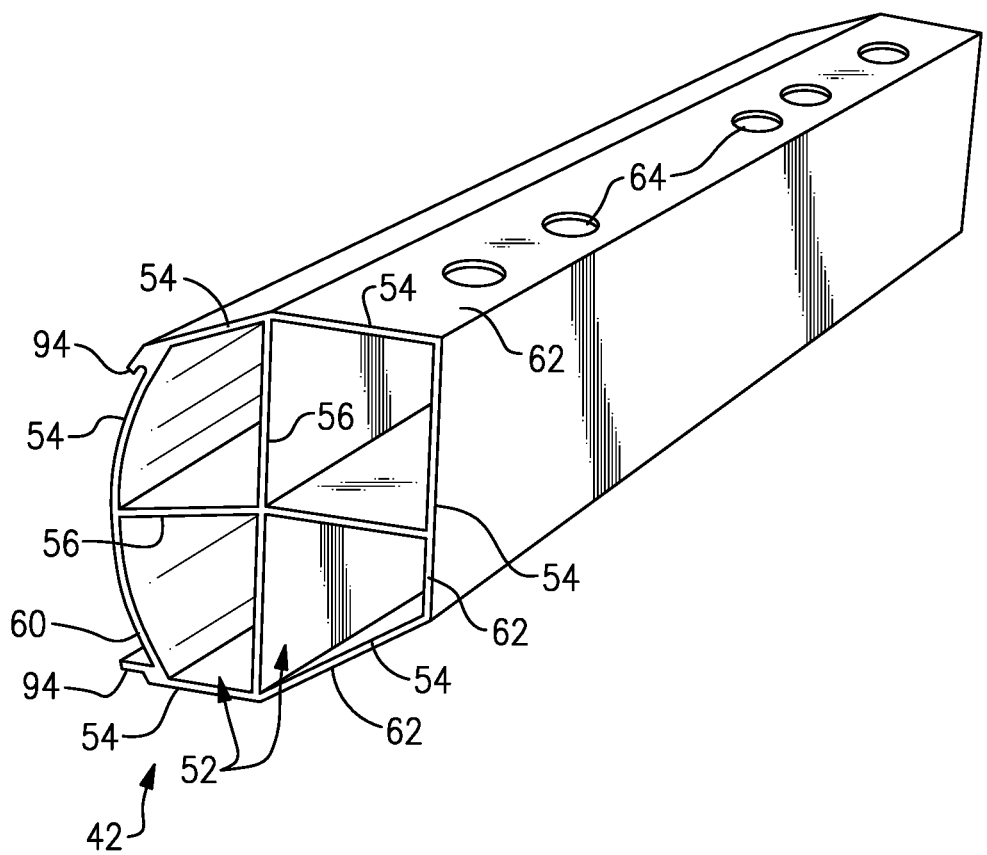
FIG. 5 is a perspective view of a second extrusion as used in the battery support structure of FIG. 4.
Figure 6:
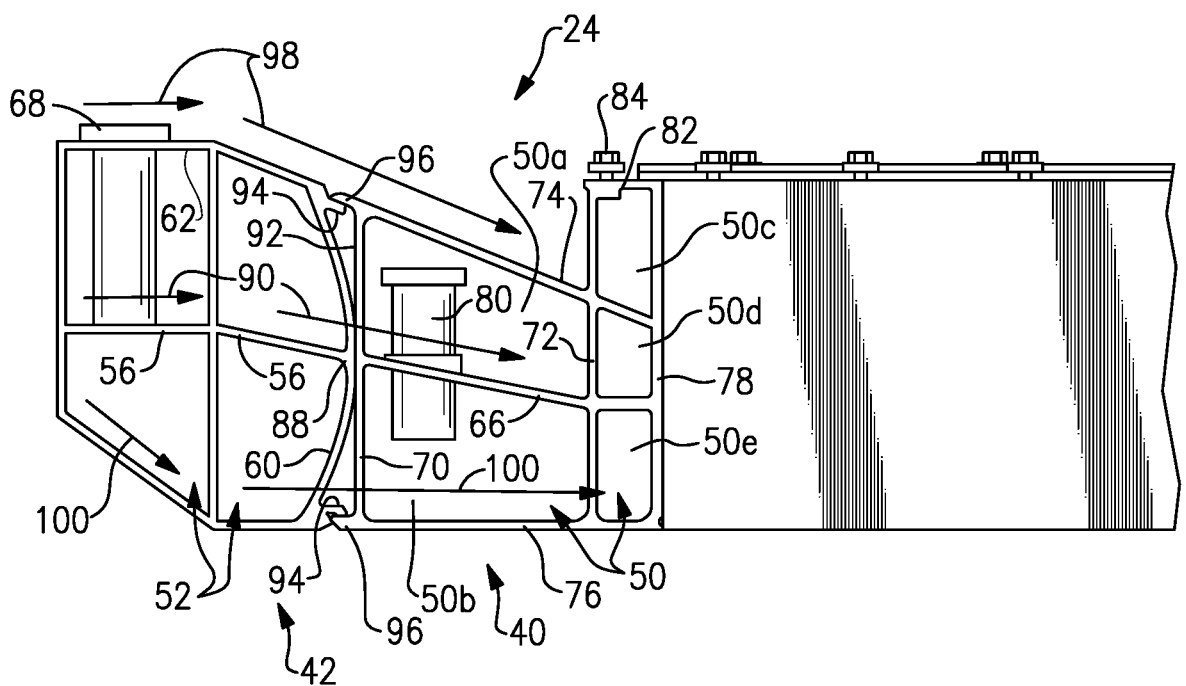
FIG. 6 is a section end view of the first and second side extrusions and showing load paths through the extrusions.

FIGS. 4-6 show the first 40 and second 42 extrusions in greater detail. In one example, the first extrusions 40, which comprise the first and second primary side rails, extend along an entirety of the first 26 and second 28 longitudinal sides of the battery support structure 24 as shown in FIG. 4. In one example, the second extrusions 42 comprise a plurality of discrete energy absorption structures that are spaced apart from each other along the first and second primary side rails. In this example, the second extrusions 42 comprise secondary side rails that extend along at least portions of the first and second primary side rails as shown in FIG. 4. This provides open areas 48 for mounting purposes and/or to accommodate other vehicle structures/components. Optionally, the second extrusions 42 could extend along the entirety of the primary side rails. The first extrusion 40 comprises a closed section with a first plurality of hollow chambers 50 (FIGS. 3 and 6) and the second extrusion 42 comprises a closed section with a second plurality of hollow chambers 52 (FIGS. 5-6) that are positioned outboard of the first plurality of closed chambers 50.

In one example, the second extrusion 42 comprises a plurality of outer walls 54 that enclose the second plurality of hollow chambers 52. The second plurality of hollow chambers 52 are separated by a plurality of internal walls 56 that are surrounded by the outer walls 54 to form the closed section. In the example shown in FIGS. 5-6, there are four hollow chambers 52; however, fewer or additional chambers could be utilized dependent upon different mounting configurations and/or to provide a desired amount of energy absorption. At least two internal walls 56 are used to form the four hollow chambers 52. In one example, one wall 56 extends generally in a vertical direction and the other wall 56 extends generally in a lateral direction. The two walls 56 intersect each other at a generally central location to divide the interior of the second extrusion 42 into four chambers 52.

In one example, the plurality of outer walls 54 comprise one or more straight wall portions to form a polygonal shape. The plurality of outer walls 54 could also include one or more curved or arcuate wall potions. Any combination of straight and curved wall portions can be used to form a desired cross-sectional shape to provide the desired amount of energy absorption. In the example shown in FIGS. 5-6, the second extrusion 42 includes at least one curved wall portion 60 and a plurality of straight wall portions 62. One or more mounting holes 64 are formed in an upper straight wall portion 62 to receive fasteners 68 (FIG. 6) to secure the battery support structure 24 to the longitudinal frame members 46 (FIG. 2).

As shown in FIG. 6, the first extrusion 40 includes at least one internal wall 66 that extends laterally across the closed section to form the first plurality of hollow chambers 50. In one example, there are at least an upper hollow chamber 50a and a lower hollow chamber 50b that are formed between an outboard wall 70, an inboard wall 72, an upper wall 74 and a lower wall 76. In one example, the first extrusion 40 also includes an additional inboard wall 78 that is spaced inboard of the first inboard wall 72. The upper wall 74 and internal wall 66 continue from the first inboard wall 72 to the additional inboard wall 78 to provide for three smaller inboard hollow chambers 50c, 50d, 50e. The additional inboard wall 78 is immediately adjacent to the battery cells 18 and other battery internal components. One of the walls may include one or more openings for fasteners 80 to mount the first extrusion 40 to other battery structure components. An additional upper wall 82 of the first extrusion 40 also includes one or more openings to receive fasteners 84 to connect a cover plate 86 (FIG. 3) to the battery support structure 24. The shape of the first extrusion 40 is one example, and it should be understood that other shapes and/or chamber configurations could also be used to provide the desired amount of energy absorption.

In one example, the curved wall portion 60 includes an apex 88 that is aligned with the internal wall 66 as shown in FIG. 6. In this example, the curved wall portion 60 abuts directly against an outboard surface 92 of the first extrusion 40 at the apex. When the vehicle 10 experiences an input load event to a side of the vehicle 10, a first load path 90 is provided along the laterally extending internal wall 56 to the curved wall portion 60 at the apex 88, and then to the first extrusion along the internal wall 66.

In one example, opposing ends of the curved wall portion 60 include flanges 94 that are fixed to corresponding flanges 96 on opposing ends of the outboard wall 70 of the first extrusion 40. As shown in FIG. 6, this provides a second load path 98 along the upper wall 74 of the first extrusion 40 and a third load path 100 along the lower wall 76 of the first extrusion 40.

In one example, the flanges 94 of the second extrusion 42 are welded to the corresponding flanges 96 on the first extrusion 40 using stitch welds or seam welds, for example. Optionally, the flanges 94, 96 could be attached using bolts, self-piercing rivets (SPRs), flow drill screws, etc., or any combination thereof.

While the first 40 and second 42 extrusions are shown as extending along the longitudinal sides 26, 28 of the battery support structure 24, they could also extend one or both of the opposing lateral sides 30, 32 to absorb impact loads from front or rear load inputs. An example of this is shown schematically at 102 in FIG. 2.

In one example, the first 40 and second 42 extrusions are formed from a metal material and can be extruded using any known extrusion method. The extrusions 40, 42 may be formed from other materials and the extrusions themselves could be made from the same material or different materials.

The subject battery tray rail side extrusions 40, 42 are used to mount the battery to the vehicle body and also to absorb energy due to impact loads against the vehicle. As known, there are many different types of vehicle configurations that have varying packaging space for battery support structures. Issues arise when trying to fit existing battery packages into new vehicle configurations. This is due to different battery to body attachment locations and packaging profiles on different vehicle platforms. Using additional extrusions members in combination with existing side rails allows an existing battery to be incorporated into wider platform configurations without significantly increasing cost.

Further, the secondary extrusion 42 provides additional energy absorption during input load events. By adding a secondary side rail extrusion 42 to the primary extrusion 40, the deformable space is increased to protect the battery internals during the time of an input load event. The number of chambers, extrusion profile, and the width of the second extrusion 42 can be optimized based on the vehicle requirements and different mounting regions. The secondary extrusion 42 also facilitates load path management.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a battery support structure to support a plurality of battery cells, wherein the battery support structure includes opposing longitudinal sides and opposing lateral sides;
   a first extrusion positioned to extend along at least one of the opposing longitudinal and lateral sides, wherein the first extrusion comprises a closed section with a first plurality of hollow chambers;
   wherein the first extrusion comprises at least first and second primary side rails extending along the opposing longitudinal sides of the battery support structure; and
   a second extrusion connected to the first extrusion such that the first extrusion is located between the plurality of battery cells and the second extrusion, and wherein the second extrusion comprises a plurality of discrete energy absorption structures that are spaced apart from each other in a longitudinal direction to provide open areas along the first and second primary side rails.

2. The apparatus according to claim 1, wherein the first and second primary side rails extend along an entirety of the opposing longitudinal sides of the battery support structure.

3. An apparatus, comprising:
   a battery support structure to support a plurality of battery cells, wherein the battery support structure includes opposing longitudinal sides and opposing lateral sides;
   a first extrusion positioned to extend along at least one of the opposing longitudinal and lateral sides, wherein the first extrusion comprises a closed section with a first plurality of hollow chambers;
   wherein the first extrusion comprises at least first and second primary side rails extending along an entirety of the opposing longitudinal sides of the battery support structure; and
   a second extrusion connected to the first extrusion such that the first extrusion is located between the plurality of battery cells and the second extrusion, and wherein the second extrusion comprises a plurality of discrete energy absorption structures that are spaced apart from each other along the first and second primary side rails.

4. The apparatus according to claim 1, wherein the second extrusion comprises first and second secondary side rails that extend along at least portions of the first and second primary side rails.

5. The apparatus according to claim 1, wherein the second extrusion comprises a plurality of outer walls that enclose a second plurality of hollow chambers.

6. The apparatus according to claim 5, wherein the second plurality of hollow chambers are separated from each other by a plurality of internal walls that are surrounded by the plurality of outer walls to form a closed section.

7. The apparatus according to claim 5, wherein at least one of the plurality of outer walls is a straight wall.

8. The apparatus according to claim 5, wherein at least one of the plurality of outer walls is a curved wall.

9. The apparatus according to claim 8, wherein the curved wall abuts directly against an outboard surface of the first extrusion.

10. An apparatus, comprising:
a battery support structure to support a plurality of battery cells, wherein the battery support structure includes opposing longitudinal sides and opposing lateral sides;
a first extrusion positioned to extend along at least one of the opposing longitudinal and lateral sides, wherein the first extrusion comprises a closed section with a first plurality of hollow chambers;
wherein the first extrusion comprises at least first and second primary side rails extending along the opposing longitudinal sides of the battery support structure;
a second extrusion connected to the first extrusion such that the first extrusion is located between the plurality of battery cells and the second extrusion, wherein the second extrusion comprises a plurality of outer walls that enclose a second plurality of hollow chambers;
wherein at least one of the plurality of outer walls is a curved wall that abuts directly against an outboard surface of the first extrusion; and
wherein opposing ends of the curved wall include flanges that are fixed to corresponding flanges on opposing ends of the outboard surface of the first extrusion.

11. The apparatus according to claim 1, wherein the second extrusion is fixed to an outboard side of each of the first extrusions, and including a rocker extending in a longitudinal direction and positioned outboard of each of the second extrusions.

12. An apparatus, comprising:
a battery support structure to support a plurality of battery cells, wherein the battery support structure includes first and second longitudinal sides and first and second lateral sides;
a plurality of cross members extending between the first and second longitudinal sides;
a first extrusion positioned to extend along each of the first and second longitudinal sides to provide first and second primary side rails; and
a second extrusion connected to the first extrusion such that the first extrusion is located inboard of the second extrusion, and wherein the second extrusion comprises a plurality of discrete energy absorption structures that are spaced apart from each other in a longitudinal direction to provide open areas along the first and second primary side rails.

13. The apparatus according to claim 12, wherein the first extrusion comprises a closed section with a first plurality of hollow chambers, and wherein the second extrusion comprises a closed section with a second plurality of hollow chambers that are positioned outboard of the first plurality of hollow chambers.

14. The apparatus according to claim 13, wherein the second extrusion includes at least one curved outer wall portion and at least one straight wall portion.

15. The apparatus according to claim 14, wherein the curved outer wall portion abuts directly against an outboard surface of the first extrusion.

16. The apparatus according to claim 14, wherein the first extrusion includes at least one internal wall that extends laterally across the closed section to form the first plurality of hollow chambers, and wherein the curved outer wall portion includes an apex that is aligned with the at least one internal wall to define a first load path from the second extrusion to the first extrusion.

17. The apparatus according to claim 14, wherein opposing ends of the curved outer wall portion include flanges that are fixed to corresponding flanges on opposing ends of an outboard surface of the first extrusion to define second and third load paths from the second extrusion to the first extrusion.

18. The apparatus according to claim 12, including a rocker extending in a longitudinal direction and positioned outboard of each of the second extrusions.

19. The apparatus according to claim 18, including longitudinal frame members having a portion extending in the longitudinal direction outboard of each of the second extrusions, and wherein each rocker connects to an outboard surface of the respective portion of the longitudinal frame members.

20. The apparatus according to claim 12, wherein each first extrusion includes upper and lower flanges extending in an outboard direction, and wherein each second extrusion includes upper and lower flanges extending in an inboard direction, and wherein the upper flanges of the first extrusions are attached to each other and the lower flanges of the first extrusions are attached to each other.

21. The apparatus according to claim 12, wherein the first extrusion comprises a closed section with a first plurality of hollow chambers.

22. An apparatus, comprising:
a battery support structure to support a plurality of battery cells, wherein the battery support structure includes opposing longitudinal sides and opposing lateral sides;
a first extrusion positioned to extend along at least one of the opposing longitudinal and lateral sides, wherein the first extrusion comprises a closed section with a first plurality of hollow chambers;
wherein the first extrusion comprises at least first and second primary side rails extending along the opposing longitudinal sides of the battery support structure;
a second extrusion connected to the first extrusion such that the first extrusion is located between the plurality of battery cells and the second extrusion; and
wherein each first extrusion includes upper and lower flanges extending in an outboard direction, and wherein each second extrusion includes upper and lower flanges extending in an inboard direction, and wherein the upper flanges of the first extrusions are attached to each other and the lower flanges of the first extrusions are attached to each other.

23. The apparatus according to claim 11, including longitudinal frame members having a portion extending in the longitudinal direction outboard of each of the second extrusions, and wherein each rocker connects to an outboard surface of the respective portion of the longitudinal frame members.

* * * * *